June 1, 1926.
V. E. EDWARDS
1,587,069
HANDLING AND CONVEYING HOT METAL STOCK
Filed Sept. 21, 1925
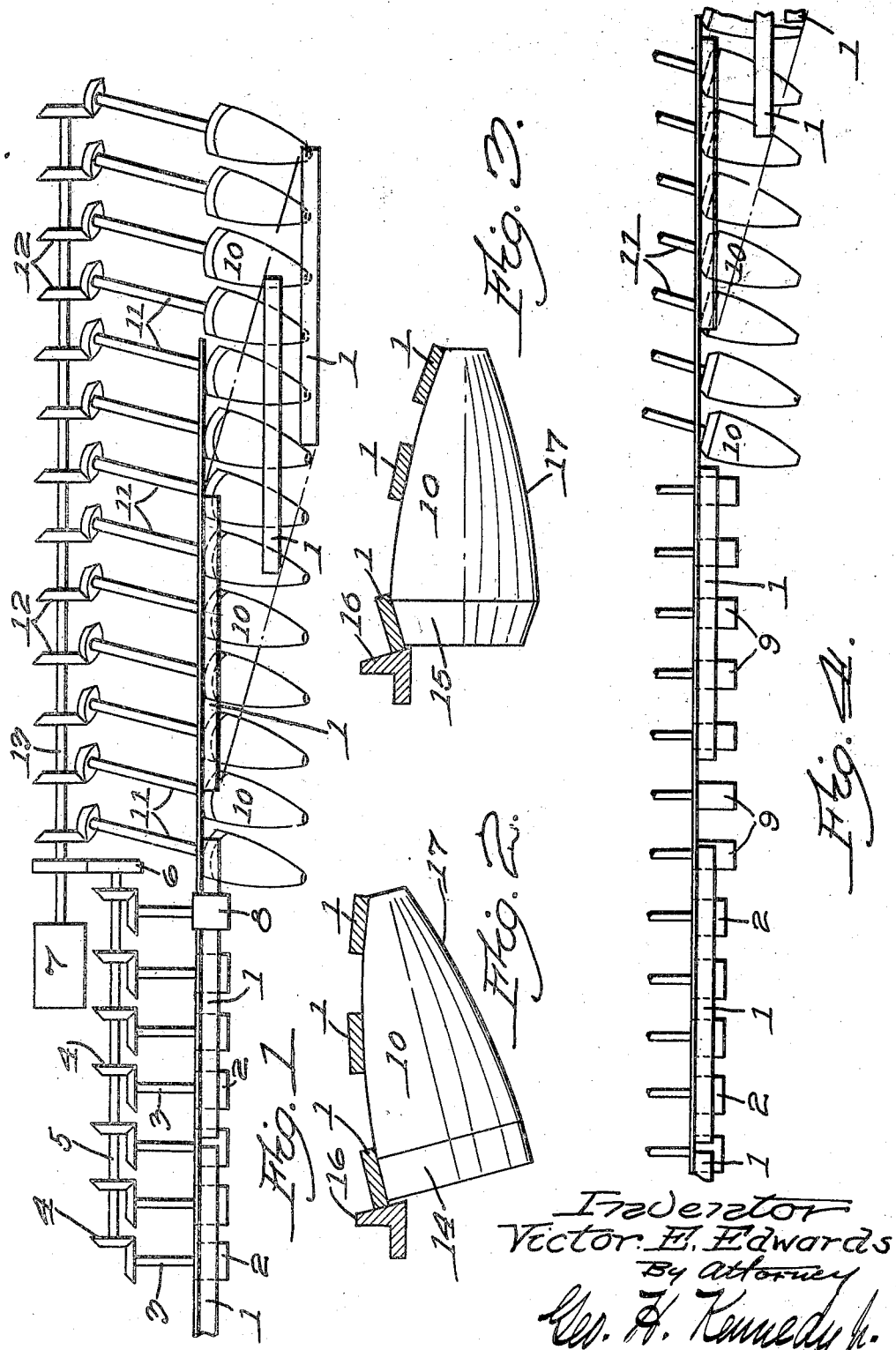

Patented June 1, 1926.

1,587,069

UNITED STATES PATENT OFFICE.

VICTOR E. EDWARDS, OF WEST BOYLSTON, MASSACHUSETTS, ASSIGNOR TO MORGAN CONSTRUCTION COMPANY, OF WORCESTER, MASSACHUSETTS, A CORPORATION OF MASSACHUSETTS.

HANDLING AND CONVEYING HOT-METAL STOCK.

REISSUED

Application filed September 21, 1925. Serial No. 57,689.

The present invention relates to a method of and apparatus for the handling and conveyance of hot bars or billets as produced by a rolling mill. More particularly, the invention contemplates the substantial removal, unobstructively, of velocity and energy from rapidly moving hot bars or billets which, for example, have been cut by a flying shear into commercial lengths from the elongated rapidly moving stock as it emerges from the final rolls of the mill. Such bars or billets, being highly heated, are extremely susceptible to bending and deformation, and it is an object of the present invention to provide for their automatic deceleration from the high speeds at which they are travelling without bending, and also to overlap successive bars in the decelerating process, thereby making it possible and safe to deposit them in a piling bin, or upon any suitable assembly table for subsequent transference to a cooling bed, or to handle them by any method of handling which is applicable to slow speed billets and bars.

The above and other objects are attained in the manner and by the means hereinafter set forth in detail, reference being had to the accompanying drawings, in which—

Fig. 1 is a plan view of apparatus illustrating the invention, the same embodying a decelerating table to which the bars are delivered.

Fig. 2 is an enlarged fragmentary view, showing one form of conical skew conveyor roll adapted to be used in said decelerating table.

Fig. 3 is a view similar to Fig. 2, showing another form of conical skew conveyor roll adapted to be used in said decelerating table.

Fig. 4 is a view similar to Fig. 1, showing a modified form of approach to said decelerating table.

Like reference characters refer to like parts in the different figures.

Referring to Fig. 1, the successive hot bars or billets 1, 1 are shown as travelling at high speed, in close order on conveyor rolls 2, 2 of ordinary construction. Said conveyor rolls 2, 2 are here shown as mounted on shafts 3, 3, the latter being driven in any suitable manner as by gearing 4, 4 from a countershaft 5, which in turn is driven by gearing 6 from a motor 7. The conveyor rolls 2, 2, in conjunction with a pair of suitably driven pinch rolls 8, constitute, in Fig. 1, the approach to the decelerating table; in this form of the invention, as hereinafter more particularly described, provision is made for adequate end clearance between successive bars arriving on said decelerating table, by rotating the latter's rolls at a definitely higher speed than the conveyor rolls 2, 2 and the pinch rolls 8.

In the other form of the invention, shown in Fig. 4, the successive hot bars or billets 1, 1, run out in close order on the conveyor rolls 2, 2, are given adequate end clearance before they reach the decelerating table by passage over a plurality of conveyor rolls 9, 9, which run at a speed definitely higher than the rolls 2, 2; this allows the rolls of the decelerating table to be run at a much slower speed than the corresponding rolls in Fig. 1. Aside from this difference in speed relations, the two decelerating tables, shown, respectively, in Figs. 1 and 4, are identical in construction, so that the following description of one of them will suffice for both.

The decelerating table is constituted by a plurality of substantially conical rolls 10, 10, whose shafts 11, 11 are driven in any suitable manner as by gearing 12, 12 from a shaft 13 of motor 7. The axes of the several rolls 10, 10 are skewed, with reference to the longitudinal line of travel of the billets or bars 1, 1 as delivered to said rolls, said axes making acute angles with the approaching bars or billets. Each roll 10 may be of the construction shown in Fig. 2, with its axis inclined upwardly, or it may be of the construction shown in Fig. 3, with its axis horizontal. In the first case, the receiving end of the roll, in alinement with the rolls 2, 2 and 8, or 9, 9, constituting the approach to the decelerating table, will be substantially cylindrical, as shown at 14, Fig. 2; in the second case, said receiving end of the roll 10, will be frusto-conical in form, as shown at 15, Fig. 3. In both cases, the billet supporting surfaces afforded by the receiving portions 14, 14 or 15, 15 of the rolls 10, 10 is inclined from the horizontal by an angle somewhat less than the angle of repose of the billets received thereon; as shown in Figs. 2 and 3, said billets as received and run out on said receiving portions 14, 14 or 15, 15 are initially maintained by gravity in sidewise contact with a side guard 16 of suitable construction. Beyond the receiving portions 14, 14 or 15, 15, the rolls 10, 10 provide elongated frusto-conical decelerating portions 17, 17, the latter preferably being surfaces of revolution generated by a curved line of large radius.

The operation of the apparatus constituting the invention in the form shown by Fig. 1 is as follows:—The hot flexible billets 1, 1 are run out by the pinch rolls 8 onto the receiving portions 14, 14 or 15, 15 of the rolls 10, 10, but notwithstanding the fact that these receiving portions have a higher surface speed than the billet, the latter is not permitted to accelerate until its rear end is released by the pinch rolls. The instant such release occurs, the billet begins to accelerate in speed, thus gradually increasing the distance between its rear end and the front end of the following billet, so as to produce a sufficient end clearance between successive billets. During this acceleration, and until the billet attains the surface speed of the receiving portions 14, 14 or 15, 15, the straight line travel of the billet, in contact with the side guard 16, is maintained, because of the fact that the friction between the billet and the supporting surfaces is a skidding friction, and such skidding friction, notwithstanding the axially skewed disposition of rolls 10, is insufficient to inaugurate the broadside uphill movement of the billet away from side guard 16 that would ordinarily occur. However, as the billet through said acceleration reaches the surface speed of the receiving portions 14, 14 or 15, 15, the frictional relation is changed from sliding to static, involving a very material increase in the coefficient of friction, so that the billet, in response to the axially skewed disposition of the rolls 10, 10 begins to travel at right angles to the axes of said rolls, being carried up the incline of the receiving surfaces and onto the portions 17, 17. On the portions 17, 17 the broadside movement, combined with the longitudinal movement, continues, and owing to this broadside movement, each billet is gradually decelerated, since the surface speed of the rolls 10, 10 grows less and less as the billet moves broadside toward the smaller ends of the conical surfaces. Such deceleration automatically establishes the overlapping of the billets as illustrated in Fig. 1, and permits, ultimately, their delivery from the rolls 10, 10 at the same point, in the absence of appreciable velocity and without having undergone any bending or deformation in the process of removing their original velocity.

In the operation of the alternative apparatus shown in Fig. 4, the action of the decelerating table, constituted by the skewed conical rolls 10, 10, is exactly the same as above described, in so far as deceleration and overlapping of billets are concerned. However, in the apparatus shown in Fig. 4, the necessary increase of end clearance between successive billets is effected by the high speed conveyor rolls 9, 9, so that the rolls of the decelerating table can be run at a lower speed instead of at a higher speed. Consequently, the initial action of the receiving portions 14, 14 or 15, 15 of said rolls 10, 10 is to decelerate each billet, and during this deceleration, involving skidding friction between the rolls and the billet, the latter maintains its edgewise contact with the side guard 16. When the billet speed has decreased to the surface speed of the rolls, the increase of friction that takes place as above described, in changing from skidding friction to static friction, allows the billet to respond to the axially skewed disposition of the rolls 10, 10 by a sidewise movement up the incline of the receiving portions 14, 14 or 15, 15, thus inaugurating the side stepping decelerating and overlapping action that occurs, as previously described, on the conical roll portions 17, 17.

In both forms of the invention, the hot billets 1, 1, notwithstanding their flexibility and susceptibility to bending and deformation, are maintained at all times in straight line condition. In this connection, it will be apparent that the endwise delivery of a hot flexible billet to skewed rolls of ordinary construction will create a tendency for the first end of the billet to move sidewise before the last end of said billet comes under the influence of said skewed rollers, thus bending the billet and deflecting it from parallelism with its previous direction of movement. According to the present invention, this possibility is obviated, because the speed differential between the approach conveyor rolls 2, 2 or 9, 9, and the decelerating rolls 10, 10, coupled with the construction employed for the receiving portions of said last named rolls, effectually delays the side stepping action of the skewed rolls 10, 10 until the entire length of the billet is supported on said rolls.

I claim:—

1. In the handling of rapidly moving hot metal bars, travelling endwise in close order, the improvement which consists in increasing the end clearance between successive bars in connection with their delivery to conical skewed decelerating rolls, operating said rolls to give their bar receiving portions a different surface speed from the delivery speed of said billets, and maintaining each billet on said rolls in its line of delivery until its speed reaches said surface speed.

2. In the handling of rapidly moving hot metal bars, travelling endwise in close order, the improvement which consists in delivering said bars successively to conical skewed decelerating rolls, creating skidding friction between said bars and the receiving portions of said rolls by giving the latter a surface speed which is different from the delivery speed of said bars, and maintaining each bar by gravity in line with its direction of delivery until said skidding friction is changed to static friction by the bar's attainment of said surface speed, whereupon side stepping of said bar on said skewed rolls begins.

3. In apparatus of the class described, a plurality of conical skewed conveyor rolls for the deceleration of successive hot bars delivered in close order thereto, said rolls having bar receiving portions inclined away from the sidewise direction of bar travel thereon, and means for rotating said rolls to give said portions a surface speed sufficiently different from the delivery speed of the bars, to prevent sidewise movement of a bar on said rolls until its entire length is supported on said receiving portions.

4. The combination with a plurality of conical skewed conveyor rolls adapted for the deceleration and sidestepping of successive hot bars delivered endwise thereto, of means for delivering said bars to said rolls at a speed different from the surface speed of the receiving portions of said rolls, whereby, in consequence of the skidding friction between each bar and said receiving portions, the sidestepping movement is delayed until said bar reaches a speed substantially the same as the surface speed of said receiving portions.

5. The combination with a plurality of conical skewed conveyor rolls adapted for the deceleration and sidestepping of successive hot bars delivered endwise thereto, of means for increasing the end clearance between successive bars, and means for delivering said bars to said rolls at a speed different from the surface speed of the receiving portions of said rolls, whereby, in consequence of the skidding friction between each bar and said receiving portions, the sidestepping movement is delayed until said bar reaches a speed substantially the same as the surface speed of said receiving portions.

6. The combination with a plurality of conical skewed conveyor rolls adapted for the deceleration and sidestepping of successive hot bars delivered endwise thereto, of means for delivering said bars to said rolls at a speed lower than the surface speed of the receiving portions of said rolls, thereby to increase the end clearance between successive bars, said receiving portions being inclined away from the sidewise direction of bar travel on said rolls, whereby gravity is made effective during the time of a bar's acceleration on said rolls, to prevent said sidestepping movement.

7. The combination with a plurality of conical skewed conveyor rolls adapted for the deceleration and sidestepping of successive hot bars delivered endwise thereto, of means for delivering said bars to said rolls at a speed different from the surface speed of the receiving portions of said rolls, and means for maintaining each bar on said receiving portions until its speed corresponds substantially to said surface speed.

8. The combination with a plurality of conical skewed conveyor rolls adapted for the deceleration and sidestepping of successive hot bars delivered endwise thereto, of means for delivering said bars to said rolls at a speed different from the surface speed of the receiving portions of said rolls, and means for preventing any sidestepping movement of a bar by said rolls until its speed corresponds substantially to said surface speed.

9. In the handling of rapidly moving hot metal bars, the improvement which consists in delivering said bars successively to conical skewed conveyor rolls adapted to decelerate and sidestep said bars, and maintaining each bar delivered to said rolls in its line of delivery until its entire length is supported on the receiving portions of said rolls.

10. The combination with a plurality of skewed conveyor rolls adapted for the side stepping of successive bars delivered endwise thereto, of means for delivering said bars to said rolls at a speed sufficiently greater than the surface speed of the receiving portion of said rolls to skid substantially the entire length of each bar on to said rolls.

Dated this fifteenth day of September, 1925.

VICTOR E. EDWARDS.